(12) United States Patent
Altmayer et al.

(10) Patent No.: US 11,333,195 B2
(45) Date of Patent: May 17, 2022

(54) ROLLING BEARING

(71) Applicant: Liebherr-Components Biberach GmbH, Biberach an der Riss (DE)

(72) Inventors: Thomas Altmayer, Mittelbiberach (DE); Markus Ruf, Bad Waldsee (DE); Andreas Palmer, Riedlingen (DE); Robert Zell, Schemmerhofen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 0 days.

(21) Appl. No.: 17/059,449

(22) PCT Filed: May 24, 2019

(86) PCT No.: PCT/EP2019/063476
§ 371 (c)(1),
(2) Date: Dec. 2, 2020

(87) PCT Pub. No.: WO2019/228926
PCT Pub. Date: Dec. 5, 2019

(65) Prior Publication Data
US 2021/0156422 A1    May 27, 2021

(30) Foreign Application Priority Data
Jun. 1, 2018    (DE) .................... 20 2018 103 079.5

(51) Int. Cl.
*F16C 19/50*    (2006.01)
(52) U.S. Cl.
CPC ........ *F16C 19/505* (2013.01); *F16C 2300/14* (2013.01); *F16C 2326/30* (2013.01)

(58) Field of Classification Search
CPC ...... F16C 17/04; F16C 19/381; F16C 19/545; F16C 35/061; F16C 19/583; F16C 19/56;
(Continued)

(56) References Cited
U.S. PATENT DOCUMENTS 4,126,361 A * 11/1978 Bottner ................. F16C 19/381
    384/455
4,161,344 A *  7/1979 Delarbre ................. B66C 23/84
    384/593
(Continued)

FOREIGN PATENT DOCUMENTS

BE       859931 A *  4/1978  ............. E02F 9/121
CN    104533941 A     4/2015
(Continued)

OTHER PUBLICATIONS

German Search Report in DE 20 2018 103 079.5 dated Sep. 7, 2018.
International Search Report and Written Opinion in PCT/EP2019/063476 dated Jul. 22, 2019.

*Primary Examiner* — Alan B Waits
(74) *Attorney, Agent, or Firm* — Troutman Pepper Hamilton Sanders LLP; Ryan A. Schneider

(57) ABSTRACT

An open-centered large rolling bearing having two concentric bearing rings, which are supported against one another in the axial direction of the rolling bearing by means of at least two axial bearings, which are arranged on opposite end faces of a bearing ring. In the radial direction, the bearing rings are supported against one another by at least three radial bearings, which are arranged on inner and outer circumferential sides of a bearing ring.

27 Claims, 2 Drawing Sheets

(58) Field of Classification Search
CPC .............. F16C 2240/46; F16C 2240/70; F16C 2300/14; F16C 2326/00; F16C 19/50; F16C 19/505; F16C 2326/30; B66C 23/00; B66C 23/52; B66C 23/84
See application file for complete search history.

(56) References Cited

U.S. PATENT DOCUMENTS

| | | | | |
|---|---|---|---|---|
| 4,422,697 A | * | 12/1983 | Gugel | F16C 19/381 384/452 |
| 4,573,811 A | * | 3/1986 | Andree | F16C 19/505 384/622 |
| 4,861,171 A | * | 8/1989 | Adachi | F16H 57/021 384/455 |
| 6,523,708 B2 | * | 2/2003 | Weckbecker | B66C 23/36 212/181 |
| 8,540,092 B2 | * | 9/2013 | Roodenburg | B66C 23/84 212/253 |
| 9,188,155 B2 | * | 11/2015 | Weckbecker | F16C 21/00 |
| 9,605,709 B2 | * | 3/2017 | Kaesler | F16C 19/505 |
| 9,784,308 B2 | * | 10/2017 | Fiesel | F16C 19/18 |
| 10,399,830 B2 | * | 9/2019 | De Groot | F16C 19/30 |
| 2008/0169257 A1 | * | 7/2008 | Roodenburg | F16C 19/381 212/253 |
| 2010/0044331 A1 | * | 2/2010 | Roodenburg | F16C 19/505 212/253 |
| 2010/0067838 A1 | * | 3/2010 | Frank | F16C 19/18 384/477 |
| 2015/0362009 A1 | * | 12/2015 | Kaesler | F16C 33/6659 384/455 |
| 2016/0245333 A1 | | 8/2016 | Fiesel et al. | |

FOREIGN PATENT DOCUMENTS

| | | | | |
|---|---|---|---|---|
| DE | 1179052 B | | 10/1964 | |
| DE | 2552526 A | * | 5/1977 | ............ B66C 23/84 |
| DE | 2634776 A1 | | 2/1978 | |
| DE | 2647588 A1 | | 4/1978 | |
| DE | 3905986 C1 | | 7/1990 | |
| DE | 202007011577 U1 | | 10/2007 | |
| DE | 102010027011 A1 | * | 1/2012 | ............ F16C 19/188 |
| DE | 102011000769 A1 | * | 8/2012 | ............. F16C 33/60 |
| DE | 102013100679 A1 | * | 7/2014 | ......... F16C 33/6659 |
| DE | 202013009246 U1 | | 2/2015 | |
| DE | 202019101697 U1 | * | 7/2020 | ............. F16C 19/06 |
| EP | 1001182 A1 | * | 5/2000 | ............. F16C 19/28 |
| EP | 2092204 B1 | | 8/2009 | |
| ES | 2393131 T3 | * | 12/2012 | ............ F16C 19/381 |
| WO | 2008088213 A2 | | 7/2008 | |
| WO | WO-2015055317 A2 | * | 4/2015 | ............ F16C 33/585 |
| WO | WO-2017059857 A1 | * | 4/2017 | .............. F16C 35/06 |

* cited by examiner

ROLLING BEARING

CROSS-REFERENCE TO RELATED APPLICATIONS

This application is a National Stage of International Application No. PCT/EP2019/063476 filed 24 May 2019, which claims benefit under 35 USC § 365 of DE Application No. 20 2018 103 079.5 filed 1 Jun. 2018, each of which is incorporated herein by reference in its entirety as if set forth herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

The present invention relates to a rolling bearing, more particularly an open-centered large rolling bearing, having two concentric bearing rings, rotatably relative to one another, which are supported against one another in the axial direction of the rolling bearing by means of at least two axial bearings, which are arranged on oppositely disposed end faces of a bearing ring and in the radial direction by a plurality of radial bearings, which are arranged on inner and outer circumferential sides of a bearing ring.

2. Description of Related Art

In large ring bearings for special purposes, significant bending moments and tilting forces sometimes act upon the bearing rings, and this can lead to deformation and an angular offset to the bearing rings relative to one another, and so premature wear occurs in the region of the bearing rings and rolling elements. Large rolling bearings of this type can measure several meters in diameter and can be employed on cranes, for instance, to pivot and support the support mast of a ship crane or of a harbor crane, wherein not only vertical forces but also bending moments and/or tilting loads have to be absorbed here. In this case, the problems of twisting and tilting are further aggravated when the middle or center of the bearing has to be kept free to permit the component that is to be supported, such as the crane support mast, to pass through the bearing, for example so that a rotary drive can be attached to the part that is to pass through. Due to a lack of space, the bearing rings of an open-center large rolling bearing such as this cannot be manufactured in any desired size, especially in the radial direction, and so the area moments of inertia that can be achieved in the bearing rings are limited.

In order to absorb the tilting moments that occur and to prevent the rolling elements from separation from the raceways due to the twisting of the bearing rings as far as possible, it was considered to provide a scraper ring on one bearing ring which engages in a groove on the other bearing ring and is clamped by axial and radial bearings in the groove on several sides, so to speak, in order to be able to absorb forces in different directions. A large rolling bearing is shown, for example, in the prior art document EP 20 92 204 B 1, according to which the scraper ring of one of the bearing rings should be clamped in place by two oppositely disposed axial bearings and two oppositely disposed radial bearings in the groove of the other bearing ring in order to prevent undesirable deformation of the scraper ring and to prevent the bearing rings from separating in the radial direction. A similar large rolling bearing and its installation situation on the support mast of a ship crane is disclosed in the prior art document WO 2008/088 213 A2.

While the cited documents deal substantially with the problems associated with the separation of the radial bearings as a consequence of the twisting of the bearing rings and seek to prevent a lifting of the radial bearings by clamping the scraper ring from opposite sides of the lateral surface, it is still possible for canting and twisting to occur in the region of the axial bearings. At the same time, radial deformations can lead to bearing failure.

In order to resist breakage and fatigue, such large rolling bearings must be adequately dimensioned with scraper rings at the cross-sections of the scrapers, more particularly also in the region of the scraper roots, i.e., the transitions to the bearing ring portions where further bearing parts such as bolting of the ring segments, connecting elements for the installation environment and drive parts such toothing are provided. However, an enlargement of the cross-sections in the scraper and scraper root region leads to a significant increase in weight as well as costs. This applies more particularly to very large bearings with double rollers, which can also have diameters of more than 10 m.

On the other hand, such very large bearings are particularly sensitive to even small deformations of the bearing rings and inclination of the rolling element raceways. Since the vertical crane loads and the corresponding reaction forces in the crane mast bearing usually still account for a large or considerable part of the rolling bearing load, the lower axial bearing, which has to absorb the vertical crane loads, is usually designed in the form of a load-bearing cylindrical roller bearing whose cylindrical rollers have a relatively large cylindrical roller width in order to have a sufficiently large contact line and keep the surface pressures bearable. However, such wide cylindrical roller bearings react particularly critically to tilting or inclinations of the raceways in relation to one another, since only a very small proportion of the cylindrical rollers are actually supported.

The present invention is based on the task of creating an improved rolling bearing of the type mentioned above, which avoids disadvantages of the prior art and provides the latter in an advantageous way. More particularly, the aim is to create an open-centered large rolling bearing that is stable against radial deformations even under high loads and permanently resists fatigue and breakage without requiring larger ring cross-sections in order to avoid the weight and cost disadvantages associated with thicker cross-sections. It should also be possible to absorb high axial loads without being vulnerable to tilting loads and inclinations of the raceways.

BRIEF SUMMARY OF THE INVENTION

The task is solved, according to the invention with an open-centered large rolling bearing having two concentric bearing rings that are supported against one another in the axial direction of the rolling bearing by means of at least two axial bearings, which are arranged on oppositely disposed end faces of a bearing ring, wherein in the radial direction of the rolling bearing, the bearing rings are supported against one another by several radial bearings, which are arranged on inner and outer circumferential sides of a bearing ring, wherein the bearing rings are supported against one other in the radial direction by at least three radial bearings, which are arranged on inner and outer circumferential sides of a bearing ring.

It is therefore proposed that the bearing rings be supported against one another in the radial direction by at least three radial bearings, which are distributed on the inner and outer circumferential sides of a bearing ring. Due to the distributed arrangement of the radial bearings on the inner and outer circumferential sides, the bearing rings are supported on each other in opposite directions so that each bearing ring is supported on the other bearing ring both against radial deformation inwards towards the axis of rotation of the bearing and against radial deformation outwards away from the axis of rotation. Thereby, the bearing forces can be introduced or absorbed through the three or more radial bearings at different portions of the bearing rings in order to achieve a distribution of the loads and to avoid overloads at a single ring portion. Thereby, it is possible to work with uniform, relatively thin bearing ring cross-sections and to dispense with thickening and cross-sectional enlargement of the bearing rings, thus keeping weight and material and manufacturing costs low.

Advantageously, the bearing rings can be supported against one another in the radial direction by four or more than four radial bearings, wherein three of the at least four radial bearings are arranged on an outer circumferential side of one of the bearing rings and a fourth of the at least four radial bearings is arranged on an inner circumferential side of the bearing ring. Therefore, three radial bearings act in one radial direction, e.g., outwards, while the fourth radial bearing supports inwards in the opposite direction. Surprisingly, despite such an asymmetrical radial bearing distribution, radial deformations of the bearing rings can be prevented both outward and inward equally.

More particularly, three radial bearings can be arranged to absorb radial deformations of the inner ring to the outside and radial deformations of the outer ring to the inside, while the fourth radial bearing is arranged to absorb radial deformations of the outer ring to the outside and radial deformations of the inner ring to the inside. In other words, three radial bearings can run on an outer circumferential surface of the inner ring and an inner circumferential surface of the outer ring and the fourth radial bearing can run inversely on an inner circumferential surface of the inner ring and an outer circumferential surface of the outer ring. With only three radial bearings, advantageously, two radial bearings can run on an outer circumferential surface of the inner ring and an inner circumferential surface of the outer ring and the third radial bearing can run inversely on an inner circumferential surface of the inner ring and an outer circumferential surface of the outer ring. Basically, the distribution and arrangement of the radial bearings can be done in different ways, e.g., inversely more radial bearings support the outer ring to the inside and fewer radial bearings support the outer ring to the outside, or e.g., a pairwise or symmetrical distribution can be provided, so that the same number of radial bearings support the outer ring to the inside and to the outside.

In order to achieve a compact arrangement and a firm clamping of the bearing rings to one another, it can be provided in a further development of the invention that two of the at least three radial bearings cover one another, viewed in the radial direction, which more particularly are arranged in a common plane which is perpendicular to an axis of rotation of the rolling bearing, and wherein at least one further one of the at least three radial bearings is arranged without coverage, viewed in the radial direction, with respect to all radial bearings and, if applicable, with respect to all axial bearings. More particularly, two radial bearings can be arranged in a common plane perpendicular to the axis of rotation of the bearing, and two further radial bearings can be arranged at different distance from this plane, so that the two further radial bearings, viewed in radial direction, do not cover one another or the first two radial bearings. The two other radial bearings can also be arranged axially distanced from the axial bearings so that they do not cover the axial bearings, viewed in the radial direction. More particularly, the radial bearings can be arranged on different sides of one or all of the axial bearings.

Alternatively or additionally, the two radial bearings covering one another, viewed in the radial direction, can also be arranged to cover at least one of the axial bearings, wherein more particularly two of the at least three radial bearings and two of the axial bearings together intersect a common plane which extends perpendicularly to the axis of rotation of the rolling bearing. If applicable, however, only one of the radial bearings can intersect with one or a plurality of the axial bearings in a common plane perpendicular to the bearing axis of rotation and thus cover the one or a plurality of axial bearings in the radial direction.

In order to be able to provide sufficiently large radial rolling elements in a compact, space-saving arrangement despite the increased number of radial bearings, at least one of the at least three radial bearings can have a raceway recessed in a bearing ring, the recess depth of which is more than 25% or more than 33% or more than 50% or more than 66% of a rolling element diameter of the radial bearing. Advantageously, a plurality of, or all of, the radial bearings can have such recessed raceways.

Such recessed raceways can be arranged on the inner ring and/or on the outer ring of the rolling bearing and/or on the bearing ring on which the toothing for a drive is provided. Alternatively, or additionally such a recessed raceway of a radial bearing can also be provided on a ring portion which is supported or clamped on the oppositely disposed axial end faces of the axial bearings.

Such recessed raceways can be particularly advantageous if the rolling elements of the radial bearings are cylindrical rollers. However, radial bearings can also have differently shaped rolling elements such as balls, tapered rollers, needles or barrel rollers.

The radial bearings can be arranged or positioned in different ways. In an advantageous further development of the invention, it can be provided that at least one of the at least three radial bearings is arranged in a bearing gap portion situated between the axial bearings, which are arranged on the oppositely disposed end faces of the bearing ring, and at least one other of the at least three radial bearings is arranged in another bearing gap portion not situated between any of the axial bearings. What is meant by the bearing gap is the parting line or the gap between the two concentric bearing rings.

Alternatively or additionally, all axial bearings can be arranged in a bearing gap portion situated between two or between three radial bearings. In other words, radial bearings can advantageously be provided on both sides of all axial bearings. In this configuration, before the bearing gap between the bearing rings opens to the outside or contacts the seals provided there, at least one radial bearing is provided in each case, which—in the longitudinal direction of the bearing gap—is situated closer to the bearing gap seal or opening than a next axial bearing. In principle, however, it would also be possible for an axial bearing to form the outermost bearing in the bearing gap, i.e., the bearing closest to the gap seal.

Advantageously, the bearing rings are supported against one another in the axial direction not only by two but by three or four or more axial bearings.

Here it can be advantageous to arrange two axial bearings on the same end face of a bearing ring and/or two axial bearings directly adjacent to each other on raceways that are offset to one another in the axial direction.

More particularly, according to a further independent aspect, it can be advantageously planned to support one bearing ring against the other bearing ring by at least a third axial bearing in order to be able to absorb high axial forces even with narrower bearings and to distribute them to different support points. In so doing, the two axial bearings situated on the same end face of the bearing ring are not only distanced from one another transversely but are also offset in the axial direction in order to gain more and thus greater robustness with regard to twisting and inclination. If the bearing rings are supported against one another in the axial direction by a third axial bearing, two axial bearings on the same side of one of the bearing rings can be arranged on separate raceways offset to one another in the axial direction of the rolling bearing. As a result of the axial offset of the raceways of the two axial bearings on the same end face of the bearing ring, the axial bearings gain different fulcrum ratios although they are arranged on the same end face of the bearing ring, and so improved support can be achieved in the event of twisting and raceway inclination, and the two axial bearings are never subjected to canting or withdrawal in the same way at the same time.

Advantageously, the two axial bearings arranged on the same end face of the bearing ring can each have a width that is smaller than the width of the axial bearing(s) arranged on the oppositely disposed end faces of the bearing ring. If cylindrical roller bearings are used as axial bearings, then this width is the length of the cylindrical rolling element and/or the width of the raceway of the bearing. By using two independent, relatively narrow raceways for the two axial bearings, which are arranged on the same end face of the bearing ring, it is more easily possible to adapt the inclination resulting from a deformation of the connection structure. Additionally, two such offset and relatively narrow raceways in the sum bring about a longer line contact between the rolling elements and raceways, in particular also when slight inclinations of the raceways occur as a result of deformations. Moreover, narrow raceways are also easier to produce with greater precision from a manufacturing perspective, and so shape tolerances also occur less often and carry little weight.

In principle, the axial offset of the two axial bearings, which are arranged on the same end face can be configured or dimensioned differently. In order to achieve significant decoupling with regard to twisting and different support ratios, the offset in a further embodiment of the invention is at least 10% of the diameter of the rolling element of the two axial bearings. On the other hand, in order to achieve an overall compact bearing geometry and lug contour that does not thicken the lug ring too much and leaves it stable, the offset can amount to less than 200% of the rolling element diameter. If the two axial bearings arranged on the same end face of the bearing ring have different rolling element diameters, the offset dimensions refer advantageously to the larger rolling element diameter.

Advantageously, the axial offset of the two axial bearings arranged on the same end face of the bearing ring can amount to between 10% and 100%, preferably about 10% to 75% and more particularly about 15% to 35% of the rolling element diameter. In particular, the offset can be selected in such a way that, viewed in the radial direction, the two rolling bearings with their rolling elements will still cover one another.

Considering the axial bearings arranged on oppositely disposed end faces of the respective bearing ring, the three axial bearings can advantageously have different raceway diameters.

In a further development of the invention, the bearing rings can be supported in the axial direction by a fourth axial bearing, preferably two axial bearings being arranged in pairs on each of the oppositely disposed end faces of a bearing ring.

In doing so, it can be advantageous to provide that only on one of the two oppositely disposed end faces of a bearing ring are the axial bearings provided thereon arranged on raceways offset from one another in the axial direction, while the axial bearings provided on the other of the two oppositely disposed end faces of the bearing ring are arranged on raceways without any offset from one another in the axial direction.

Alternatively, it can also be provided that on each of the two oppositely disposed end faces of a bearing ring the axial bearings there provided are each arranged on raceways which are offset relative to one another in the axial direction.

In a further development of the invention one of the bearing rings can have a radially protruding ring portion which recesses into a groove in the other bearing ring, wherein all axial bearings can be supported on the radially protruding ring portion.

Advantageously, at least not all of the radial bearings are supported by the radial protrusion ring or at least some of the radial bearings are arranged outside of the groove. More particularly it can be provided that the bearing ring with the radially protruding ring portion has at least one axially protruding ring portion, which axially protrudes from the radially protruding ring portion and/or extends outside the groove in which the radially protruding ring portion is recessed, wherein at least two of the at least three radial bearings are supported on the at least one axially protruding ring portion.

In an advantageous further development of the invention, it can be provided that one of the at least two axial bearings arranged on the same end face of the bearing ring covers the or each axial bearing arranged on the other end face of the bearing ring, as viewed in the axial direction, while the other of the two axial bearings arranged on the same end face of the bearing ring does not have any coverage with the axial bearing situated on the other end face of the bearing ring.

In alternative further development of the invention, the arrangement of the axial bearings can also be such that each of the axial bearings—when viewed in the axial direction—has coverage with at least one of the axial bearings situated on the other end face of the bearing ring.

In principle, however, it would also be possible that an axial bearing situated on the other end face of the bearing ring is arranged between the two axial bearings situated on the same end face of the bearing ring, i.e., the rolling elements of the axial bearing situated on one end face of the bearing ring run on a raceway diameter that is situated between the raceway diameter of the two other axial bearings situated on a common end face of the bearing ring.

The arrangement of the radial bearings to one another can in principle be different. In an advantageous further development of the invention, two or more radial bearings can cover one another, viewed in the radial direction, e.g., be arranged in a common plane perpendicular to the axis of rotation of the rolling bearing.

The configuration of the radial bearings can thereby be affected in different ways. According to an advantageous configuration of the invention, the two radial bearings can have rolling elements with different geometries, in particular one of the radial bearings can be configured as cylindrical roller bearing and the other radial bearing can be configured as ball bearing. On the one hand, by using the cylindrical roller bearing, high radial forces can be transmitted with a compact radial design, while on the other hand forces with axial components can also be transmitted by the ball bearing, which also has a supporting effect in directions inclined to the radial direction.

In alternative further development of the invention, however, all radial bearings can also have the same rolling element type or the same geometry type, in particular all of them can be formed as cylindrical roller bearings.

These and other objects, features and advantages of the present invention will become more apparent upon reading the following specification in conjunction with the accompanying drawing figures.

BRIEF DESCRIPTION OF THE DRAWINGS

The accompanying Figures, which are incorporated in and constitute a part of this specification, illustrate several aspects described below.

DETAIL DESCRIPTION OF THE INVENTION

Figure 1:
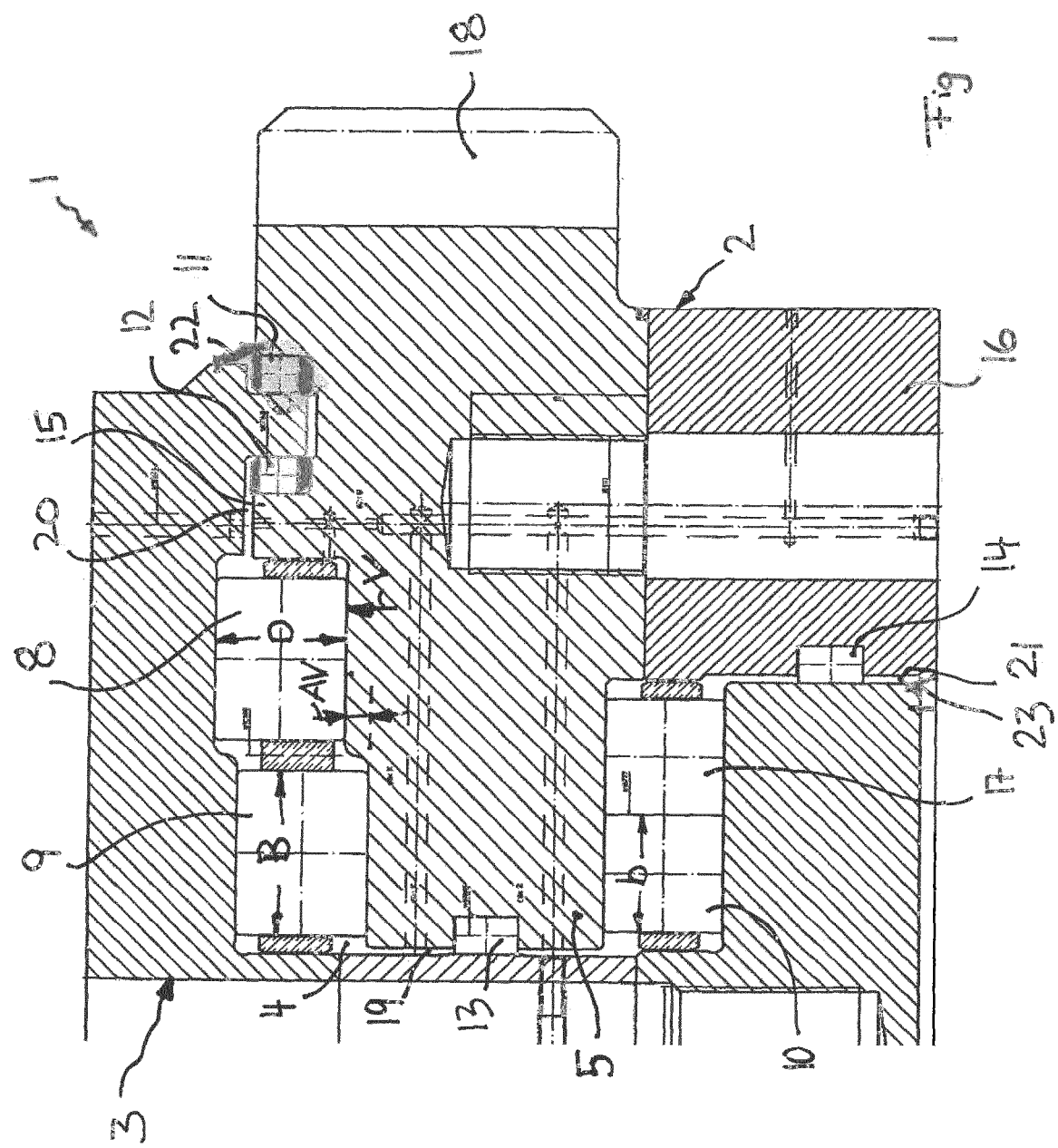
FIG. 1: shows a longitudinal half-section of an open-centered rolling bearing according to an advantageous embodiment of the invention, in which the two bearing rings are supported against one another by four axial bearings in the form of cylindrical roller bearings and four radial bearings also in the form of cylindrical roller bearings.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

As FIG. 1 and also the other figures show, the rolling bearing 1 can comprise two bearing rings 2 and 3, of which one bearing ring 2 forms an inner ring and the other bearing ring 3 an outer ring. The inner ring 2 can have a smaller inner diameter than the outer ring 3 and/or the outer ring 3 can have a larger outer diameter than the inner ring 2.

One of the bearing rings 3, preferably the outer ring, can have a groove 4 open towards the other bearing ring 2, preferably towards the inner ring, in which the other bearing ring 2 engages with a radially projecting ring portion 5 provided thereon, forming a gap or with clearance on all sides. The groove 4 can advantageously encompass the radially protruding ring portion 5 from three sides, namely on one jacket surface side and on two axially oppositely disposed end faces of the ring portion 5.

As will be explained later, all axial bearings can be supported by the radially protruding ring portion 5.

It can further be provided that the bearing ring 2 with the radially protruding ring portion 5 has at least one ring portion 15, 16, which is axially protruding with respect to the ring portion 5 and which axially protrudes from the radially protruding ring portion 5 and/or extends outside the groove 4 in which the radially protruding ring portion 5 is recessed.

More particularly, the bearing ring 2 can have two such axially protruding ring portions 15, 16, which project axially from the radially protruding ring portion 5 to the oppositely disposed sides, cf. FIG. 1.

As it will be explained later, at least two of the at least three radial bearings can be supported on the at least one axially protruding ring portion 15, 16, wherein advantageously at least one radial bearing is supported on each of the axially protruding ring portions 15, 16, cf. FIGS. 1 and 2.

Figure 2:
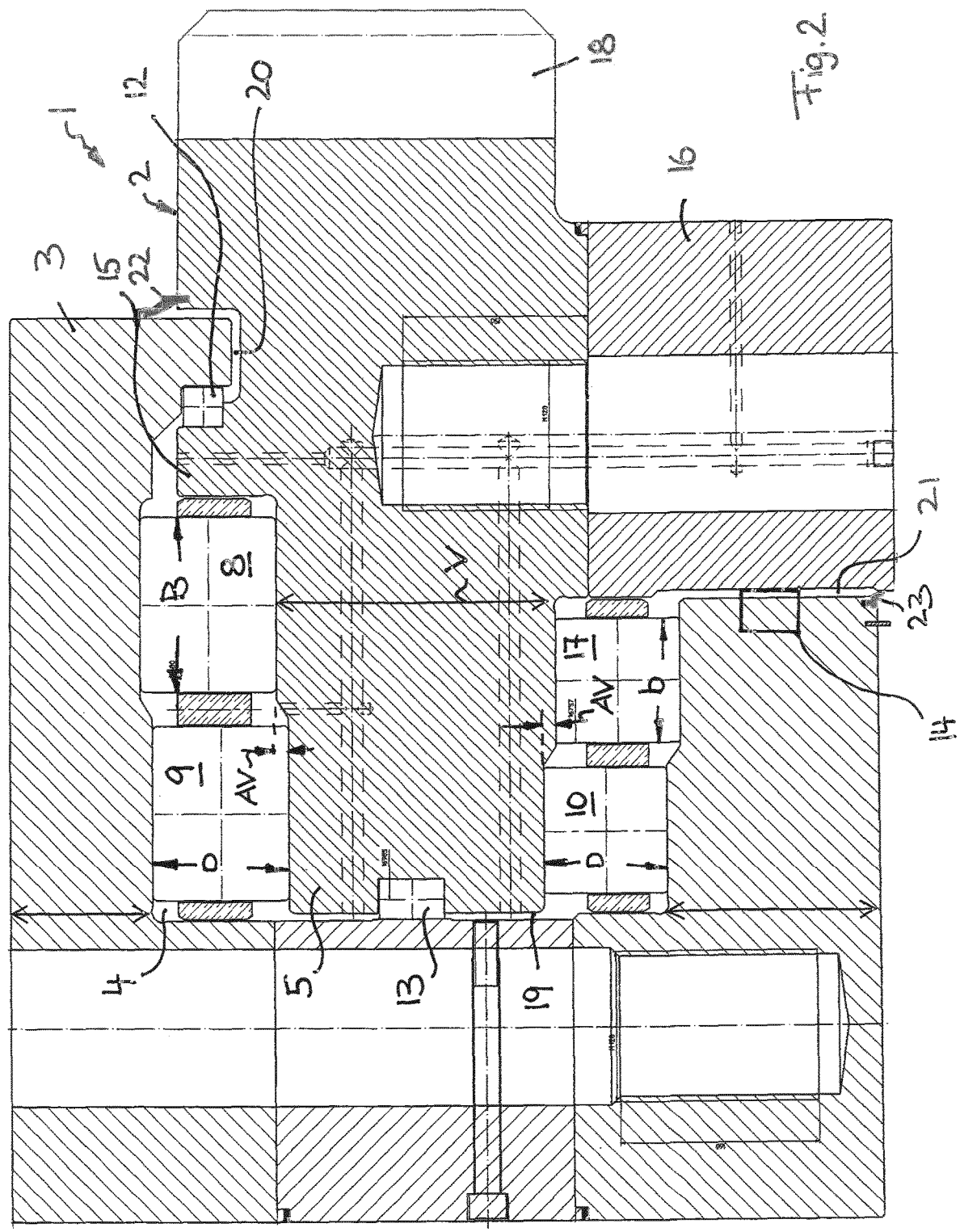
FIG. 2: shows a longitudinal half-section through an open-centered rolling bearing according to a further advantageous embodiment of the invention, in which the two bearing rings are also supported against one another by four axial bearings in the form of cylindrical roller bearings and three radial bearings in the form of cylindrical roller bearings arranged in pairs with an offset to one another.

The groove 4 in bearing ring 3 can comprise—roughly speaking—a U-shaped bottom contour, in which the groove bottom—according to FIGS. 1 and 2 each on the left, top and bottom—is encompassed by bearing ring limbs of bearing ring 3. To be able to insert the other bearing ring 2 with its radially protruding ring portion 5 into the groove 4, the bearing ring 3 comprising the groove 4 can be composed of a support ring 6 and a retaining ring 7 that can be placed on the support ring, cf. FIGS. 1 and 2.

The bearing ring 2 with its radially protruding ring portion 5 is supported opposite the groove 4 by four axial bearings 8, 9 and 10, 17 and by four radial bearings 11, 12, 13, 14.

Advantageously, two of the axial bearings 8 and 9 can be arranged on the same—according to FIG. 1 on the lower—end face of the bearing ring and two further axial bearings 10 and 17 on the oppositely disposed end face of the bearing ring, i.e., on oppositely disposed end faces of the radial protrusion 5.

As FIG. 2 shows, the two axial bearings 8 and 9 provided on the same end face of the bearing ring are not only distanced from one another in the radial direction and arranged on different raceways, but they are also offset from one another in the axial direction—i.e., in the direction of the arrow V—and so the two axial bearings 8 and 9 are not situated at the same height.

The axial offset AV can thereby advantageously amount to about 15% to 35%, more particularly about 20% of the diameter D of the rolling elements of the axial bearings 8 and 9.

The two axial bearings 8 and 9 arranged on the same end face of the bearing ring can have a width B—measured in the radial direction—which is in each case greater than the width b of the axial bearings 10 and 17 arranged on the opposite end face of the bearing ring, wherein the difference in width can amount to about 10% to 50%, preferably about 15% to 35%, i.e., B can be 110% to 150% and 115% to 135% of b. In the event of twisting of the bearing rings, such different roll widths can prevent all axial bearings from tilting as well as from bearing unequal loads.

The two axial bearings 8 and 9 situated on the same end face of the bearing ring can be positioned in such a way that each axial bearing 8, 9 covers at least one of the axial bearings 10, 17 situated on the opposite end face of the bearing ring, when viewed in the axial direction.

As FIG. 1 shows, the axial bearings 10, 17 can be arranged on the oppositely disposed side without any offset, i.e., at the same axial height, wherein the two rows of axial bearings can, if necessary, run on a continuous, common raceway and/or can be arranged in an essentially gap-free manner in the radial direction. Alternatively, the axial bearings 10, 17 can also run distanced radially on separate raceways.

Notwithstanding the above, axial bearings 10, 17 on the oppositely disposed side but also—similar to the other oppositely disposed axial bearings 8, 9—can not only be distanced from one another in the radial direction and arranged on different raceways but can also be arranged offset to one another in the axial direction—i.e., in the direction of the arrow V—so that the two axial bearings 8 and 9 are not at the same height, cf. also FIG. 2, which shows such an arrangement with axial offset on both sides of the radially protruding ring portion 5.

As FIG. 1 further shows, the bearing rings 2, 3 are supported against one another in the radial direction by four or even more than four radial bearings 11, 12, 13, 14, wherein three of the at least four radial bearings 11, 13, 14 are arranged on an outer circumferential side of one, preferably inner, bearing ring 2 and a fourth of the at least four radial bearings 12 is arranged on an inner circumferential side of the bearing ring 2. In so doing the three radial bearings 11, 13, 14 support the inner bearing ring 2 in the radial direction outwards, while the fourth radial bearing 12 supports the inner bearing ring 2 in the opposite direction inwards.

In principle, the distribution and arrangement of the radial bearings 11, 12, 13, 14 can be done in different ways, e.g., inversely more radial bearings support the outer ring 3 to the inside and fewer radial bearings support the outer ring 3 to the outside, or e.g., a pairwise or symmetrical distribution can be provided, so that the same number of radial bearings support the outer ring 3 to the inside and to the outside.

In order to achieve a compact arrangement and a firm clamping of the bearing rings to one another, it can be provided in a further development of the invention that two of the at least three radial bearings 12, 12 cover one another, viewed in the radial direction, which more particularly are arranged in a common plane which is perpendicular to an axis of rotation of the rolling bearing, and wherein at least one further one of the at least three radial bearings 13, 14 is arranged without coverage, viewed in the radial direction, with respect to all radial bearings and, if applicable, with respect to all axial bearings 8, 9, 10, 17. More particularly, two radial bearings can be arranged in a common plane perpendicular to the axis of rotation of the bearing, and two further radial bearings can be arranged at different distance from this plane, so that the two further radial bearings, viewed in radial direction, do not cover one another or the first two radial bearings. The two other radial bearings 13, 14 can also be arranged axially distanced from the axial bearings 8, 9, 10, 17 so that they do not cover the axial bearings, viewed in the radial direction.

More particularly, the radial bearings can be arranged on different sides of one or all of the axial bearings.

Alternatively or additionally, the two radial bearings covering one another, viewed in the radial direction, can also be arranged to cover at least one of the axial bearings, wherein more particularly two of the at least three radial bearings and two of the axial bearings together intersect a common plane which extends perpendicularly to the axis of rotation of the rolling bearing.

If applicable, however, only one of the radial bearings 11 can intersect with one or a plurality of the axial bearings 8, 9 in a common plane perpendicular to the bearing axis of rotation and thus cover the one or a plurality of axial bearings 8, 9 in the radial direction, as shown for instance in FIG. 2.

In order to be able to provide sufficiently large radial rolling elements in a compact, space-saving arrangement despite the increased number of radial bearings, at least one of the radial bearings 13, 14 can have a raceway recessed in a bearing ring 2, the recess depth of which is more than 25% or more than 33% or more than 50% or more than 66% of a rolling element diameter of the radial bearing. Advantageously, a plurality of, or all of, the radial bearings can have such recessed raceways. FIG. 1 shows the two radial bearings 13 and 14 with such recessed raceways, wherein alternatively or additionally one or both of the radial bearings 11 and 12 can be configured as recessed.

Such recessed raceways can be arranged on the inner ring 2 and/or on the outer ring 3 of the rolling bearing and/or on the bearing ring 2 on which a toothing 18 is provided for an unspecified drive whose pinion can mesh with the toothing.

Such recessed raceways can be particularly advantageous if the rolling elements of the radial bearings 11, 12, 13, 14 are cylindrical rollers, as shown in FIG. 1 and FIG. 2. In principle, radial bearings 11, 12, 13, 14 can also have differently shaped rolling elements such as balls, tapered rollers, needles or barrel rollers.

The radial bearings 11, 12, 13 and 14 can also be arranged or positioned differently than in FIG. 1 or FIG. 2. In an advantageous further development of the invention, it can be provided that at least one of the at least three radial bearings 13 is arranged in a bearing gap portion 19 situated between the axial bearings 8, 9 and 10, 17, which are arranged on the oppositely disposed end faces of the bearing ring, and at least one other of the radial bearings 11, 12 is arranged in another bearing gap portion 20 or 21 not situated between any of the axial bearings 8, 9, 10, 17. What is meant by the bearing gap is the parting line or the gap between the two concentric bearing rings 2, 3.

Alternatively or additionally, all axial bearings can be arranged in a bearing gap portion situated between two or between three radial bearings. In other words, radial bearings 11, 12, 14 can advantageously be provided on both sides of all axial bearings 8, 9, 10, 17. In this configuration, before the bearing gap between the bearing rings 2, 3 opens to the outside or contacts the seals 22, 23 provided there, at least one radial bearing is provided 11, 12; 14 in each case, which—in the longitudinal direction of the bearing gap—is situated closer to the bearing gap seal 22, 23 or opening than a next axial bearing 8, 17. In principle, however, it would also be possible for an axial bearing to form the outermost bearing in the bearing gap, i.e., the bearing closest to the gap seal.

The rolling bearing shown in FIG. 2 corresponds to the set of features of the embodiment shown in FIG. 1 and differs from the embodiment shown in FIG. 1 substantially in the number of radial bearings and the arrangement of the axial bearings.

On the one hand, in FIG. 2 not only the axial bearings 8 and 9 arranged on one of the end faces of the bearing ring are offset to one another in the axial direction, but also the axial bearings 10, 17 arranged on the oppositely disposed end face of the bearing ring. Here again, the axial bearings 10, 17 can have a smaller width b than the oppositely disposed axial bearings 8, 9. Furthermore, the arrangement of the two axial bearings 8 and 9 can also be such that they cover one another in the axial direction with the two oppositely disposed axial bearings 10, 17.

Furthermore, as shown in FIG. 2, there can also be provided only three radial bearings 12, 13, 14, which can advantageously be distributed over the bearing gap and the axial bearings similar to the embodiment according to FIG. 1.

More particularly, two radial bearings 13, 14 can be arranged on an outer circumferential side of one, preferably inner bearing ring 2 and a fourth of the at least four radial bearings 12 can be arranged on an inner circumferential side of the bearing ring 2. In so doing the three radial bearings 11, 13 support the inner bearing ring 2 in the radial direction outwards, while the fourth radial bearing 12 supports the inner bearing ring 2 in the opposite direction inwards.

Insofar as the embodiment of FIG. 2 corresponds to the embodiment according to FIG. 1 in further aspects, in particular also with regard to the bearing arrangement and distribution, reference may be made to the foregoing description.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

The invention claimed is:
1. A rolling bearing comprising:
   a first bearing ring;
   a second bearing ring;
      wherein the first and second bearing rings are concentric; and
      wherein each bearing ring has:
         oppositely disposed end faces; and
         inner and outer circumferential sides;
   a first axial bearing;
   a second axial bearing; and
   at least three radial bearings, each supporting only a radial load;
   wherein the first and second bearing rings are supported against one another in the axial direction of the rolling bearing by means of the first and second axial bearings that are arranged on the oppositely disposed end faces of the first bearing ring; and
   wherein the first and second bearing rings are supported against one another in the radial direction by the at least three radial bearings such that at least one of the radial bearings is arranged on the inner circumferential side of the first bearing ring and at least one other of the radial bearings is arranged on the outer circumferential side of the first bearing ring.

2. The rolling bearing according to claim 1, wherein the at least three radial bearings comprise four radial bearings;
   wherein the first and second bearing rings are supported against one another in the radial direction by the four radial bearings;
   wherein three of the four radial bearings are arranged on the outer circumferential side of the first bearing ring; and
   wherein a fourth of the four radial bearings is arranged on the inner circumferential side of the first bearing ring.

3. The rolling bearing according to claim 1, wherein two of the at least three radial bearings are arranged in a common plane which is perpendicular to an axis of rotation of the rolling bearing; and
  wherein a third of the at least three radial bearings is not arranged in the common plane.

4. The rolling bearing according to claim 1, wherein two of the at least three radial bearings and at least one of the first and second axial bearings together intersect a common plane that extends perpendicularly to an axis of rotation of the rolling bearing.

5. The rolling bearing according to claim 1, wherein at least one of the at least three radial bearings has a raceway that is recessed in the first bearing ring; and
  wherein the recess depth of the raceway is more than 25% of a rolling element diameter of the radial bearing.

6. The rolling bearing according to claim 1, wherein at least one of the at least three radial bearings is arranged in a bearing gap portion located between the first and second axial bearings that are arranged on the oppositely disposed end faces of the first bearing ring; and
  wherein at least one other of the at least three radial bearings is arranged in another bearing gap portion not located between the first and second axial bearings.

7. The rolling bearing according to claim 1, wherein the first and second axial bearings are arranged in a bearing gap portion that is located between two of the radial bearings.

8. The rolling bearing according to claim 1 further comprising a third axial bearing supporting the first and second bearing rings in the axial direction;
  wherein the first and second axial bearings are arranged on the same end face of the first bearing ring with raceways axially offset from one another.

9. The rolling bearing according to claim 8, wherein an axial offset (AV) of the two raceways of the first and second axial bearings arranged at the same end face of the first bearing ring amounts to between 10% and 200% of a rolling element diameter D of the first and second axial bearings.

10. The rolling bearing according to claim 8 further comprising a fourth axial bearing supporting the bearing rings in the axial direction;
  wherein the first and second axial bearings are arranged in a pair on one of the oppositely disposed end faces of the first bearing ring; and
  wherein the third and fourth axial bearings are arranged in a pair on the other oppositely disposed end face of the first bearing ring.

11. The rolling bearing according to claim 10, wherein only on one of the two oppositely disposed end faces of the first bearing ring are the first and second axial bearings provided thereon arranged on raceways offset from one another in the axial direction, while the third and fourth axial bearings provided on the other of the two oppositely disposed end faces of the first bearing ring are arranged on raceways without any offset from one another in the axial direction.

12. The rolling bearing according to claim 10, wherein on each of the two oppositely disposed end faces of the first bearing ring the four axial bearings there provided are each arranged on raceways which are offset relative to one another in the axial direction.

13. The rolling bearing according to claim 10, wherein each axial bearing has a width:
  wherein the width of the third axial bearing is smaller than the width of the first axial bearing;
  wherein the width of the third axial bearing is smaller than the width of the second axial bearing;
  wherein the width of the fourth axial bearing is smaller than the width of the first axial bearing; and
  wherein the width of the fourth axial bearing is smaller than the width of the second axial bearing.

14. The rolling bearing according to claim 10, wherein each of the first and second axial bearings arranged on one end face of the first bearing ring covers at least one of the third and fourth axial bearings that are arranged on the oppositely disposed end face of the first bearing ring, viewed in the axial direction.

15. The rolling bearing according to claim 10, wherein the at least three radial bearings comprise four radial bearings;
  wherein the first and second bearing rings are supported against one another in the radial direction by the four radial bearings; and
  wherein the third and fourth axial bearings are arranged opposite to one another by exactly three or four of the radial bearings that are arranged on opposite sides and exactly four axial bearings that are arranged on opposite sides.

16. The rolling bearing according to claim 8, wherein an axial offset (AV) of the two raceways of the first and second axial bearings arranged at the same end face of the first bearing ring amounts to between 10% and 100% of a rolling element diameter D of the first and second axial bearings.

17. The rolling bearing according to claim 8, wherein an axial offset (AV) of the two raceways of the first and second axial bearings arranged at the same end face of the first bearing ring amounts to between 15% and 35% of a rolling element diameter D of the first and second axial bearings.

18. The rolling bearing according to claim 1, wherein the first bearing ring is an inner bearing ring that has a radially protruding ring portion that recesses into a groove in the second bearing ring that is an outer bearing ring; and
  wherein all of the axial bearings are supported on the radially protruding ring portion.

19. The rolling bearing according to claim 18, wherein the first bearing ring with the radially protruding ring portion has at least one axially protruding ring portion that axially protrudes from the radially protruding ring portion and/or extends outside the groove in which the radially protruding ring portion is recessed; and
  wherein at least two of the at least three radial bearings are supported on the at least one axially protruding ring portion.

20. The rolling bearing according to claim 1, wherein the first and second bearing rings each have a diameter of more than 1 m.

21. The rolling bearing according to claim 20, wherein the first and second bearing rings each have a diameter of more than 5 m.

22. The rolling bearing according to claim 20, wherein the first and second bearing rings each have a diameter of more than 10 m.

23. The rolling bearing according to claim 1, wherein the first and second bearing rings are formed in a segmented way.

24. The rolling bearing according to claim 1, wherein two of the at least three radial bearings and the first and second axial bearings together intersect a common plane that extends perpendicularly to an axis of rotation of the rolling bearing.

25. The rolling bearing according to claim 1, wherein at least one of the at least three radial bearings has a raceway that is recessed in the first bearing ring; and
  wherein the recess depth of the raceway is more than 50% of a rolling element diameter of the radial bearing.

26. The rolling bearing according to claim 1, wherein at least one of the at least three radial bearings has a raceway that is recessed in the first bearing ring; and wherein the recess depth of the raceway is more than 66% of a rolling element diameter of the radial bearing.

27. The rolling bearing according to claim 1, wherein the first and second axial bearings are arranged in a bearing gap portion that is located between three of the radial bearings.

\* \* \* \* \*